Figure 1:
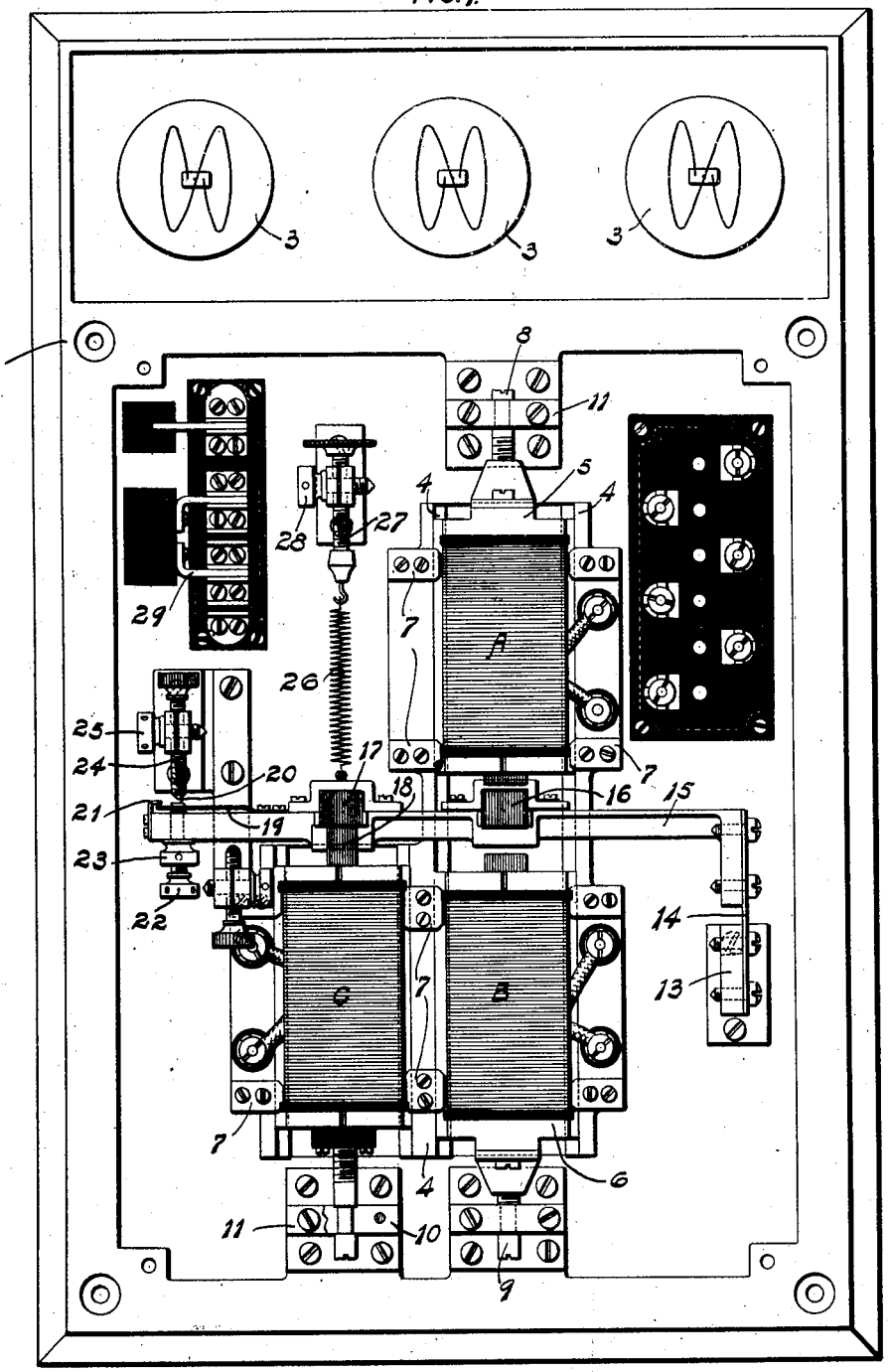

G. S. NEELEY.
APPARATUS FOR REGULATING THE FIELD DENSITY OF ELECTRIC GENERATORS.
APPLICATION FILED AUG. 15, 1910.

1,155,001.

Patented Sept. 28, 1915.
2 SHEETS—SHEET 1.

WITNESSES

INVENTOR
GEORGE SPENCER NEELEY
BY
ATT'Y.

G. S. NEELEY.
APPARATUS FOR REGULATING THE FIELD DENSITY OF ELECTRIC GENERATORS.
APPLICATION FILED AUG. 15, 1910.
1,155,001.
Patented Sept. 28, 1915.
2 SHEETS—SHEET 2.
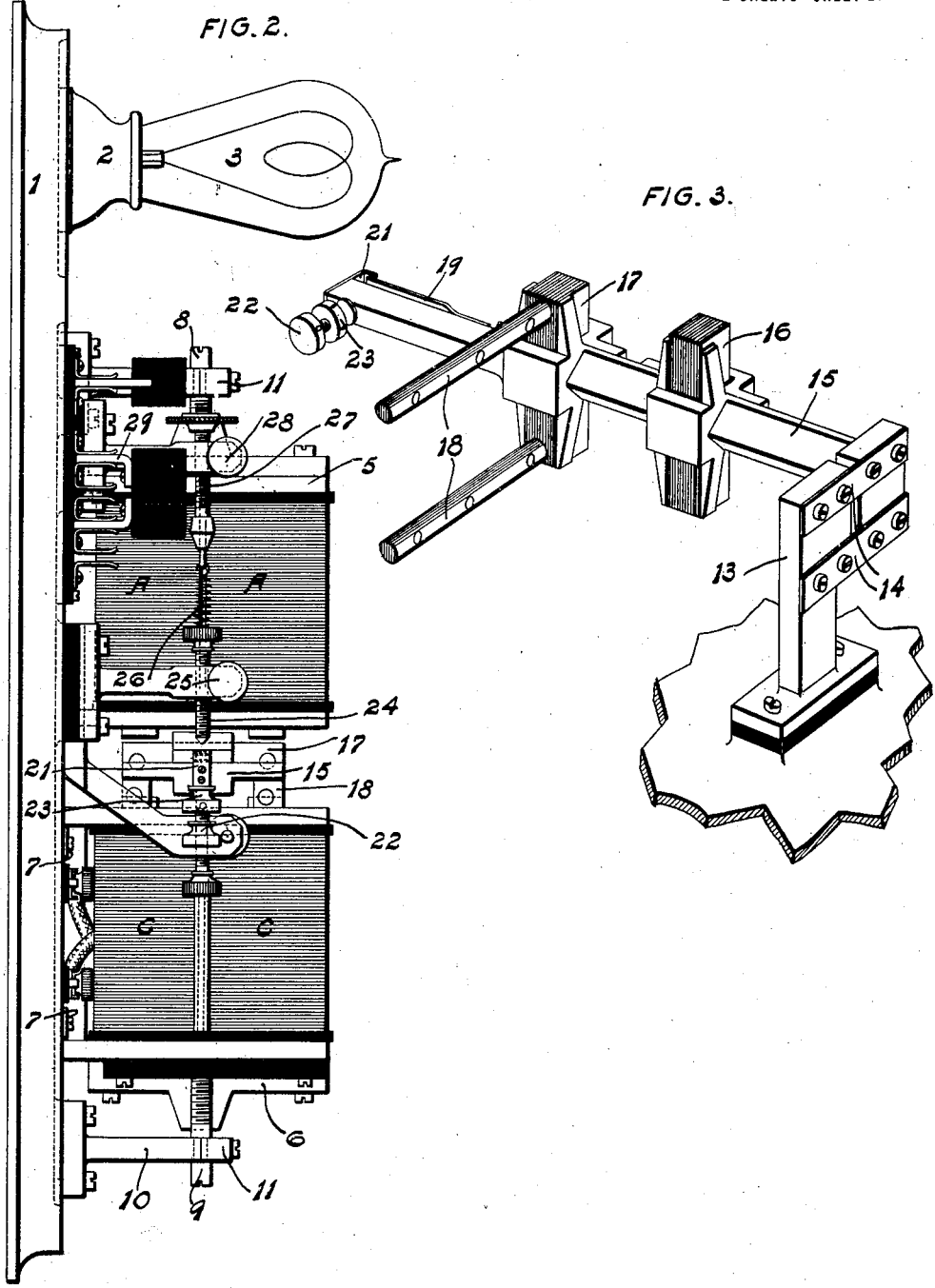
WITNESSES
INVENTOR
GEORGE SPENCER NEELEY
ATT'Y

UNITED STATES PATENT OFFICE.

GEORGE SPENCER NEELEY, OF ST. LOUIS, MISSOURI, ASSIGNOR, BY MESNE ASSIGNMENTS, TO GENERAL ELECTRIC COMPANY, A CORPORATION OF NEW YORK.

APPARATUS FOR REGULATING THE FIELD DENSITY OF ELECTRIC GENERATORS.

1,155,001. Specification of Letters Patent. Patented Sept. 28, 1915.

Application filed August 15, 1910. Serial No. 577,361.

*To all whom it may concern:*

Be it known that I, GEORGE SPENCER NEELEY, a citizen of the United States, residing at St. Louis, Missouri, have invented a certain new and useful Improvement in Apparatus for Regulating the Field Density of Electric Generators, of which the following is a full, clear, and exact description, such as will enable others skilled in the art to which it appertains to make and use the same, reference being had to the accompanying drawings, forming part of this specification.

My invention relates to a new and useful improvement in an apparatus for regulating the field density of electric generators, and is designed particularly for use in connection with the system of regulation disclosed in former United States Letters Patent granted to me as follows: Nos. 838800, 801 and 802, dated December 18, 1896; Nos. 862272, 273 and 274, dated August 6, 1907; No. 879887, dated February 25, 1898; and No. 904887, dated November 24, 1908.

In the regulating system disclosed in my aforesaid patents there is a variable resistance in the field circuit of the generator, or in the field circuit of the exciter, said resistance being controlled by magnets. One of these magnets is controlled entirely by the variation of the intensity of the current supplied to the work-circuit or system, or such part of it as it may be found necessary to use. An opposing magnet is controlled by the intensity of the shunt-field exciting current when regulating the field of a direct-current dynamo or by the exciter field current, if regulating an alternating dynamo. The advantage of having these magnets controlled from these sources resides in the fact that these sources of variation are the primary sources of all voltage fluctuation, excepting that occasioned by a speed variation in the driving motor. Thus there are provided two operating electro-magnets which are energized from sources varying in a ratio that will change the field resistance at the correct instant to prevent voltage fluctuation.

My system also contemplates the use of a suitable resistance, preferably carbon, in the shunt field circuit of the exciter or of the working dynamo, if self exciting, and for convenience of connecting and disconnecting this resistance it is preferably in the form of a specialized type of incandescent lamp to suit the special requirements. This resistance is capable of carrying about eighty per cent. of the shunt field current when heated to a state of incandescence. When using this special carbon resistance it is found that there is a diminution of its retarding action as its temperature rises, which is very desirable, as it serves to relieve the contacts which constitute the variable resistance as the load and field current of the dynamo increases. In a shunt around this carbon resistance is maintained an electric arc, the length of which is varied and controlled by the magnets, one of which as above stated is in turn directly controlled by the intensity of the current supplied to the system, and the other by the intensity of the current supplied to the shunt-field of the dynamo, or that of the exciter when connected to regulate the voltage of alternating current dynamos. Mechanically yielding means, preferably a spring, is also employed, whose tension is added to the magnet controlled by the intensity of the current supplied to the system. This affords means for conveniently and initially adjusting the regulator to any desired normal voltage. A third electro-magnet is also employed, this being energized by the voltage of the system, whereby the regulator automatically compensates in the field resistance for decreased or increased speeds, thereby keeping the voltage of the dynamo and the system constant, regardless of ordinary speed changes.

To the above purposes my invention consists in certain novel features of construction and arrangements of parts hereinafter more fully described and shown in the accompanying drawings in which, Figure 1 is a front elevational view of my improved apparatus for regulating the field density of electric generators. Fig. 2 is a side elevational view of the apparatus. Fig. 3 is a perspective view of the vibrating arm.

In the drawings, 1 indicates a base-plate which may be of any desired material, on which are arranged sockets 2 for the carbon resistance in the form of lamps 3, before referred to.

4 are guide-ways mounted in vertical alinement in which are mounted magnet-carrying frames 5 and 6, said frames being held in position by cleats 7, said frames being independently adjustable toward and from each other by means of screws 8 and 9. These screws pass through posts 10, whose caps 11 are removable, said caps being fitted within reduced portions of the screws, whereby said screws, while rotatable within the posts, are prevented from moving longitudinally therein.

A represents a pair of magnets carried by the frame 5, said magnets being energized by the intensity of the current supplied to the system, or such part of it as it may be found necessary to use, the energizing current of this magnet being preferably derived from a series or current transformer, or shunt, not shown, which furnishes any proportional part of the current of the working circuit which may be desired. A pair of magnets B are energized in proportion to the shunt field exciting current, and are opposed to the magnets A. The magnets C are arranged in an adjustable frame similar to those in which the magnets A and B are mounted and these magnets C are energized by the voltage supplied to the system and are used to automatically compensate for the changes of speed and keep the voltage of the dynamo and system constant, with respect to ordinary speed changes.

13 is a post or arm extending from the plate 1, having flexible leaf-spring members 14 secured thereto constituting a hinge or axis of movement, said elements 14 having an arm 15 secured to their outer or free ends, which arm carries a laminated armature 16, (see Fig. 3) which is influenced by the degree of magnetizaton of the magnets A and B. Arm 13 also carries an armature 17 having extensions 18, which extensions project into the voltage magnets C and are influenced by the strength of said magnets. The outer end of the arm 15 is provided with a tongue 19 constituting a flexible support for a platinum contact 20. The outer movement of this tongue is controlled by a hooked plate 21.

22 is a contact screw whose adjusted position is fixed by means of a jam nut 23. Screw 22 is mounted in the arm 15 and determines the extent of the inward movement of the platinum contact 20.

24 is a fixed contact screw threaded in a split post through which passes a clamping screw 25 to lock the contact screw 24 in adjusted position.

26 is a spring tending to lift the arm 15 so as to move the contact 20 into electrical engagement with the screw 24. In doing this the spring assists the magnets A. The tension of the spring may be adjusted by means of a screw 27 which is held in its adjusted position by a clamping-screw 28, similar to the manner of adjusting and locking the fixed contact screw 24.

29 is a pole changer which reverses the current with respect to the vibrating arm so that the lives of the fixed and movable platinum contacts may be lengthened.

It is believed to be unnecessary to give a detailed description of the electrical connections to the various magnets and other parts of my improved apparatus, as the same will be understood from the description of my system and by reference to my aforesaid patents.

One of the improved features of my present apparatus is the manner of mounting the vibrating arm 15. I have discovered that the well known pivoting means are not well adapted to my apparatus, because the movement of the arm 15 must, of necessity, be so slight in compensating for slight variations in its influencing forces, that lost motion is objectionable. I therefore prefer the spring supporting plates 14, which are firmly connected and which obviate any possibility of lost motion, but which are of such sensitiveness as to instantly respond to any variation in the influencing forces.

What I claim is:—

1. A regulating device comprising in combination a flexibly mounted arm provided with a contact, a second contact adapted to coöperate therewith, a first electro-magnet mounted at one side of said arm, a second electro-magnet mounted on the opposite side of said arm, said electro-magnets tending to move said arm in opposite directions, mechanical tension means operating on said arm independently of said electro-magnets and tending to move said arm toward said first mentioned electro-magnet, and a third electro-magnet adapted to coöperate with said arm to move the same away from said first electro-magnet against the influence of said mechanical tension means.

2. A regulating device comprising the combination of a flexibly mounted arm provided with a contact, another contact adapted to coöperate with said first mentioned contact, an armature mounted on said arm, a first electro-magnet mounted at one side of said arm and adapted to attract said armature but having no mechanical connection with said arm, a second electro-magnet mounted at another side of said arm but having no mechanical connection therewith and adapted to coöperate magnetically with said armature, a second armature mounted on said arm intermediate its free end and said first mentioned armature, a third electro-magnet having magnetic coöperation with said second armature whereby it operates to move said arm against the influence of said first electro-magnet, and a yielding pressure means coöperating with said arm independently of said electro-magnets and adapted to restrain said arm against movement in accordance with the influence of said third electro-magnet.

3. A regulating device comprising the combination of a flexibly mounted arm, an electrical contact member carried thereby, a second contact member with which said first mentioned contact member is adapted to coöperate electrically, a first electro-magnet adapted to coöperate magnetically with said arm but having no mechanical connection therewith, a yielding pressure means having mechanical connection with said arm independently of said first electro-magnet, said first electro-magnet and said yielding pressure means operating to swing said arm to close said contacts, a second electro-magnet, and a third electro-magnet adapted to coöperate with said arm to move the same to open said contacts.

4. A voltage regulator comprising a fixed contact, a flexibly supported movable contact member associated therewith, resilient means urging said contacts together, opposing electromagnets located upon opposite sides of said movable member, but having no mechanical connection therewith, and a third electromagnet opposing said resilient means.

In testimony whereof I hereunto affix my signature in the presence of two witnesses, this 8th day of August, 1910.

GEORGE SPENCER NEELEY.

Witnesses:
M. P. SMITH,
B. L. CROWLEY.

Copies of this patent may be obtained for five cents each, by addressing the "Commissioner of Patents, Washington, D. C."